US012507010B2

(12) United States Patent
Cai

(10) Patent No.: US 12,507,010 B2
(45) Date of Patent: Dec. 23, 2025

(54) SYSTEM AND METHOD FOR LOW LATENCY INDIVIDUAL SOUND ZONES

(71) Applicant: Harman International Industries, Incorporated, Stamford, CT (US)

(72) Inventor: Tingli Cai, Ann Arbor, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 183 days.

(21) Appl. No.: 18/396,076

(22) Filed: Dec. 26, 2023

(65) Prior Publication Data

US 2024/0214733 A1 Jun. 27, 2024

Related U.S. Application Data

(60) Provisional application No. 63/435,483, filed on Dec. 27, 2022.

(51) Int. Cl.

*H04R 5/02* (2006.01)
*H04R 1/40* (2006.01)
*H04R 3/12* (2006.01)
*H04R 5/04* (2006.01)
*H04S 7/00* (2006.01)

(52) U.S. Cl.

CPC .......... *H04R 5/023* (2013.01); *H04R 1/403* (2013.01); *H04R 3/12* (2013.01); *H04R 5/04* (2013.01); *H04S 7/302* (2013.01); *H04R 2430/20* (2013.01); *H04R 2499/13* (2013.01)

(58) Field of Classification Search

CPC .......... H04R 1/403; H04R 3/12; H04R 5/023; H04R 5/04; H04R 7/302; H04R 2430/20; H04R 2499/13; H04S 7/302

See application file for complete search history.

(56) References Cited

U.S. PATENT DOCUMENTS

| | | | | |
|---|---|---|---|---|
| 9,338,554 | B2 * | 5/2016 | Christoph | H04S 7/301 |
| 9,357,304 | B2 * | 5/2016 | Christoph | H04S 1/00 |
| 9,847,081 | B2 * | 12/2017 | Oswald | H04S 3/008 |
| 11,862,139 | B2 * | 1/2024 | Pignier | G10K 11/17857 |
| 2011/0286614 | A1 * | 11/2011 | Hess | H04S 7/303 381/302 |

* cited by examiner

*Primary Examiner* — Jason R Kurr
(74) *Attorney, Agent, or Firm* — Angela M. Brunetti

(57) ABSTRACT

A system and method for generating low latency sound zones in a listening space utilizing only headrest speaker(s) within a predetermined distance of each sound zone. The audio signals are processed by a processing module connected to the headrest loudspeakers to generate audio for the headrest loudspeakers that is greater than or equal to 300 Hz, reducing the processing load and limiting latency to 5 msec.

10 Claims, 4 Drawing Sheets

SYSTEM AND METHOD FOR LOW LATENCY INDIVIDUAL SOUND ZONES

CROSS-REFERENCE

This application claims priority to provisional application 63/435,483 filed Dec. 27, 2022, in the United States, the disclosure of which is incorporated herein by reference in its entirety.

TECHNICAL FIELD

The present disclosure relates to processing audio in individual sound zones and more particularly to processing audio in low latency individual sound zones.

BACKGROUND

Common loudspeaker arrangements in an interior of a vehicle include a plurality of loudspeakers distributed throughout the interior. For example, broadband loudspeakers, midrange loudspeakers, and tweeters may be disposed in various places in the vehicle, including the vehicle headrest, to provide audio sources at various listening positions in the vehicle. A surround sound system may also be utilized which may include woofers and may also include midrange loudspeakers and tweeters.

Individual sound zones (ISZs) integrate the personal audio needs of each listener in the vehicle while managing the audio outputs of the overall vehicle cabin. It is desirable to provide sufficient separation between zones, particularly in relation to the low frequency region while generating audio in the vehicle cabin utilizing the vehicle surround system.

However, when delivering a full range of audio content (20 Hz-20 kHz) to an individual sound zone, all the speakers in the vehicle are used to generate seat-based audio content. Unfortunately, the distance between a head of each listener and the surround speakers creates acoustical delays, no less than 3 ms. Further, the requirement to generate low frequency audio content means that a digital signal processing (DSP) system uses FIR filters with many taps. This adds significant load to the DSP and results in the DSP having to create a large buffer to limit the processing load. The tradeoff for decreasing processing power is an increase in buffer size and thereby an increase in latency, which typically exceeds 20 ms and may sometimes reach 100 ms which reduces the quality of the audio for a listener in the ISZ.

There is a need for low latency in individual sound zones to reduce processing requirements and reduce costs for implementing ISZ.

SUMMARY

A system and method for achieving both zonal separation and sound quality by way of a hybrid processing system. A first audio signal is filtered with a high pass (HP) infinite impulse response (IIR) filter and equalizing IIR filters 306. The first audio signal is also filtered with a band pass (BP) IIR filter to extract audio content within a voice frequency band (300 Hz-3400 Hz). The first extracted audio signal is down-sampled and filtered by a set of crosstalk cancellation (CTC) finite impulse response (FIR) filters.

A second audio signal is filtered with a HP IIR filter and equalizing IIR filters. The second audio signal is also filtered with a bandpass (BP) IIR filter to extract audio content within the voice frequency band. The second extracted audio signal is down-sampled and filtered by a set of crosstalk CTC FIR filters.

The first and second CTC FIR filtered signals are up-sampled respectively. The first up-sampled audio signal is recombined with the equalized first audio input signal. A set of IIR filters equalizes the recombined first audio input signal and outputs S1(jω) to the speaker in a first Individual Sound Zone associated with the first audio signal.

The second up-sampled audio signal is recombined with the equalized second audio signal. A set of IIR filters equalizes the recombined second audio signal and outputs to the speaker in a second ISZ.

Each ISZ in the listening space utilizes only headrest speaker(s) within a predetermined distance of each ISZ and does not involve any other speakers in the listening space. The audio signals are processed by a processing module connected to the loudspeakers in a headrest of the ISZ. The processing module is configured to generate audio for the headrest loudspeakers 122 that is greater than or equal to 300 Hz, reducing the processing load and limiting latency to 5 msec.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1 through 5, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
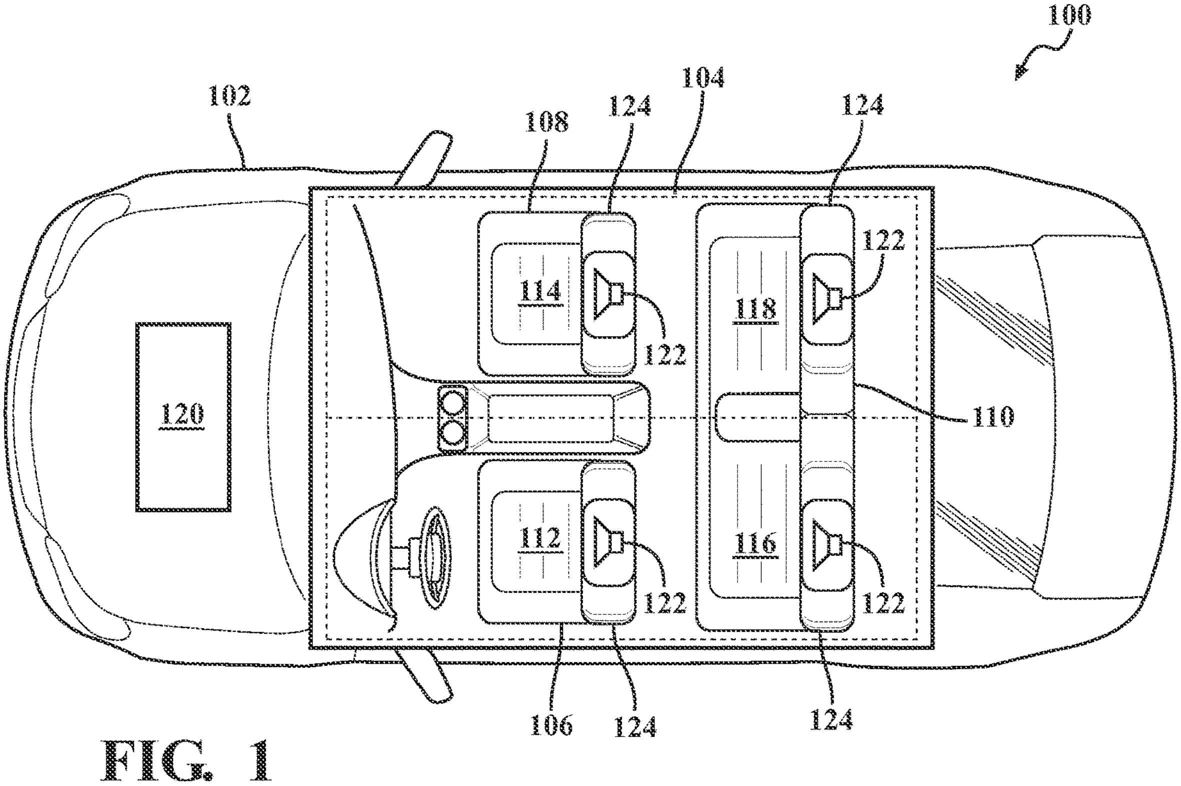
FIG. 1. is an example arrangement for an audio system having individual sound zones (ISZs) in a listening space.

FIG. 1 is an example arrangement 100 for a vehicle 102 having one or more individual sound zones (ISZs) in a cabin 104 of the vehicle 102. The cabin 104 has a plurality of ISZs 112-118 at several listening positions in one listening environment. Front seats, including a driver seat 106 and a front passenger seat 108 may each be associated with a dedicated ISZ. Passenger seats, including a rear seat 110 may have multiple zones. It should be noted that four ISZs 112, 114, 116, 118 are shown in the example arrangement 100 of FIG. 1, but there may be fewer or more zones in a vehicle cabin. For example, a vehicle without rear seating, a vehicle with one zone for the rear seats, or a vehicle with multiple rows of rear seats.

The vehicle 102 has an audio system 120. One or more loudspeakers 122 are disposed in a headrest 124 at each listening position in the vehicle cabin 104 as part of a vehicle audio system. Current technology for ISZ focuses on generating full-bandwidth audio content at each zone. This approach requires utilizing both proximity (headrest) speakers and surround speakers, such as door woofers and subwoofers positioned throughout the listening space. However, generating full-bandwidth audio content requires a large FIR filter matrix that typically adds significant load to processing. As the filters require a considerable number of taps for each zone speaker, e.g., 4096, the digital signal processor system must create a large buffer (1024, for example) to limit processing load. The trade-off is an increased latency, which is undesirable. The latency may exceed 20 msec and in some cases, may reach 100 msec.

Focusing on ISZ implementation for 300 Hz and above, which covers the range of voice applications, allows only headrest speakers to be utilized. Surround woofers and other loudspeakers in the listening environment are not utilized. This approach reduces the acoustical delay and requires far less FIR filtering (less than 512 taps for each zone-speaker at the sample rate of 48 khz, and even fewer taps at a lower sample rate). The result is a low-cost ISZ system with reduced channel number and reduced FIR filter length for each channel. This significantly reduces the MIPS requirement, which, in turn, allows for a much shorter buffer size, thereby significantly decreasing the overall latency. In practice, overall latency is reduced within a range of 2-5 msec.

Figure 2:
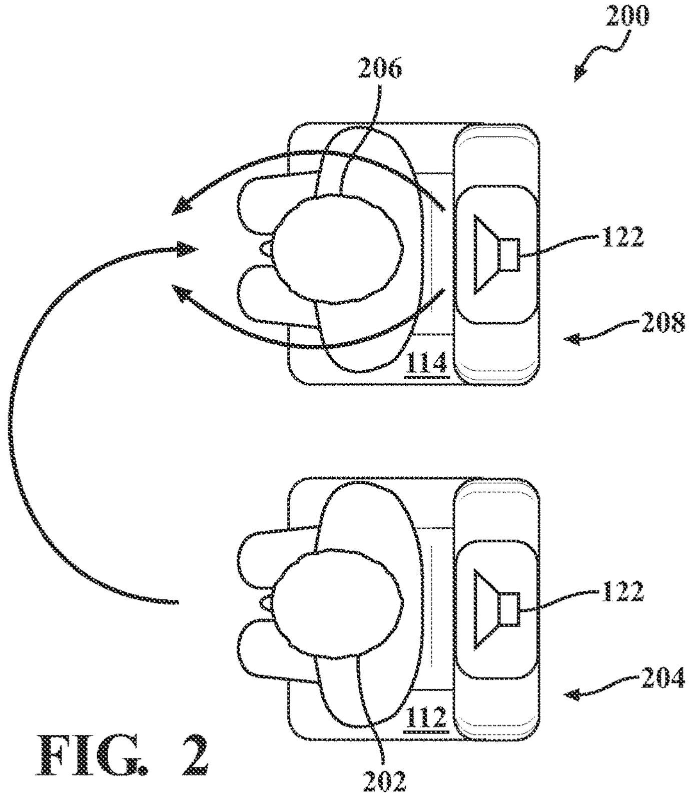
FIG. 2 is an example of an arrangement of a first ISZ and a second ISZ.

FIG. 2 is a diagram 200 of bright and dark zones according to the inventive subject matter for ISZs 112, 114 in the driver seat 106 and the front passenger seat 108 respectively. A listener 202 in ISZ 112 may be receiving audio and is in a bright zone 204. The bright zone is a sound zone where the audio is reproduced to be heard. A listener 206 does not want to hear the audio being listened to by the listener 202 in the bright zone. Listener 206, in the front passenger ISZ 114 in this example, is in a dark zone 208. The dark zone 208 is a sound zone where audio is suppressed as much as possible.

Each ISZ has at least one loudspeaker 122 disposed within a predetermined distance to the listener 202, 206. The position of the at least one loudspeaker position for the ISZ is within inches of a head of the listener 202, 206. According to the inventive subject matter, to create a bright zone for the listener 204, audio content is limited to 300 Hz or above. The result is the ISZ 112 is dedicated to audio in the range of 300 Hz and above. The loudspeaker 122 in the dark zone 208 cancels the loudspeaker signal from the bright zone 204. Knowing that for each listening position in the listening environment, only audio above 300 Hz will be heard by the listener in that ISZ.

Figure 3:
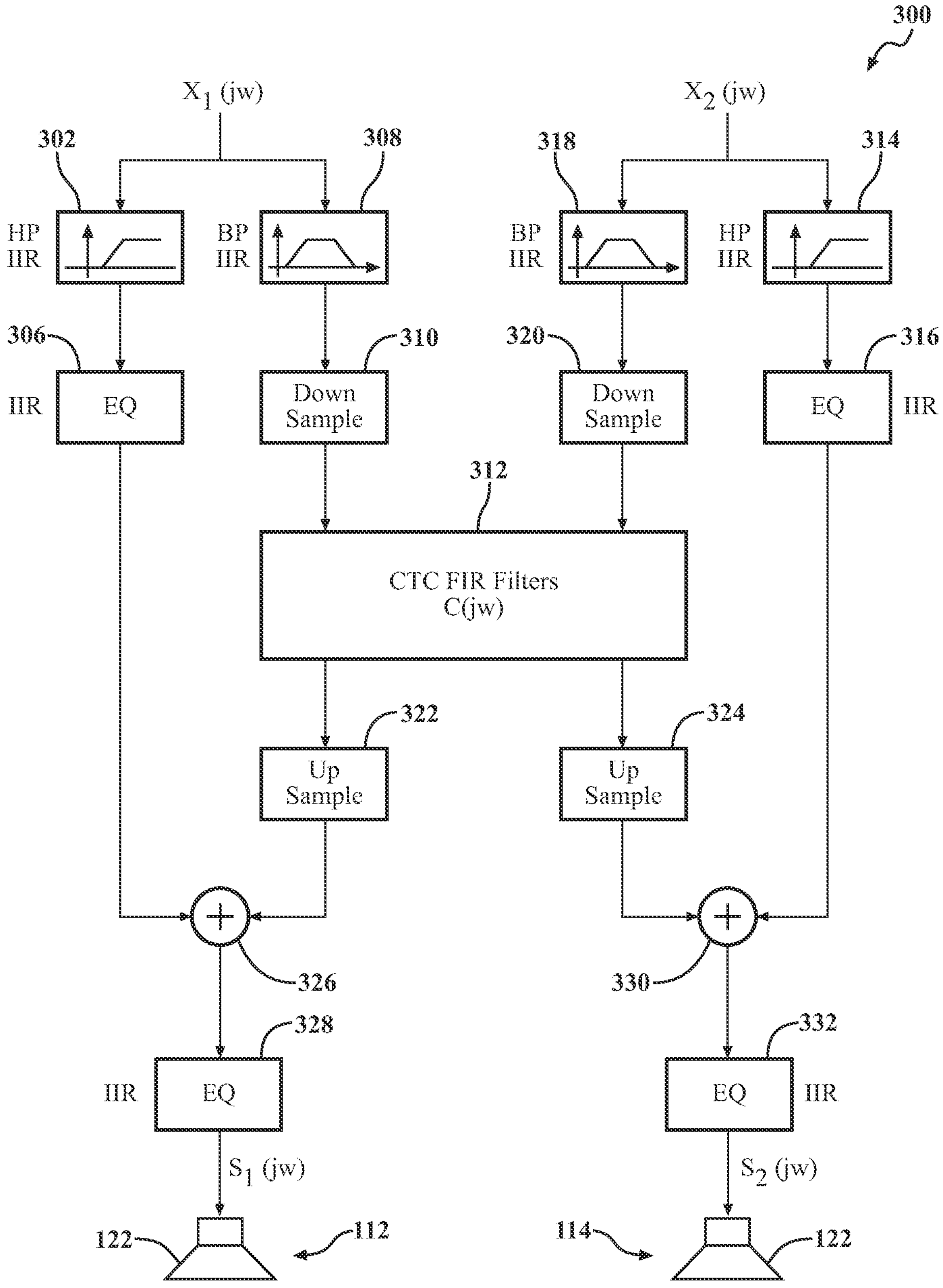
FIG. 3 is block diagram of a hybrid processing system.

FIG. 3 is a block diagram 300 is a block diagram of a system for achieving both zonal separation and sound quality by way of a hybrid processing system. A first audio signal $X_1$ is filtered with a high pass (HP) infinite impulse response (IIR) filter 302 and equalizing IIR filters 306. The first audio signal $X_1$ is also filtered with a band pass (BP) IIR filter 308 to extract audio content within a voice frequency band (300 Hz-3400 Hz). The first extracted audio signal is down-sampled 310 and filtered by a set of crosstalk cancellation (CTC) finite impulse response (FIR) filters 312 (to be described in detail hereinafter with FIG. 4).

A second audio signal $X_2$ is filtered with a HP IIR filter 314 and equalizing IIR filters 316. The second audio signal is also filtered with a BP IIR filter 318 to extract audio content within the voice frequency band. The second extracted audio signal is down-sampled 320 and filtered by a set of crosstalk CTC FIR filters 312.

The first and second CTC FIR filtered signals are up-sampled 322, 324 respectively. The first up-sampled audio signal is recombined 326 with the equalized first audio input signal. A set of IIR filters 328 equalizes the recombined first audio input signal and outputs $S_1(j\omega)$ to the speaker 122 in the ISZ associated with the first audio signal $X_1$, which is the first ISZ 112 in this example.

The second up-sampled audio signal is recombined 330 with the equalized second audio signal. A set of IIR filters 332 equalizes the recombined second audio signal and outputs to the speaker 122 in another ISZ, which is the second ISZ 114 in this example.

Figure 4:
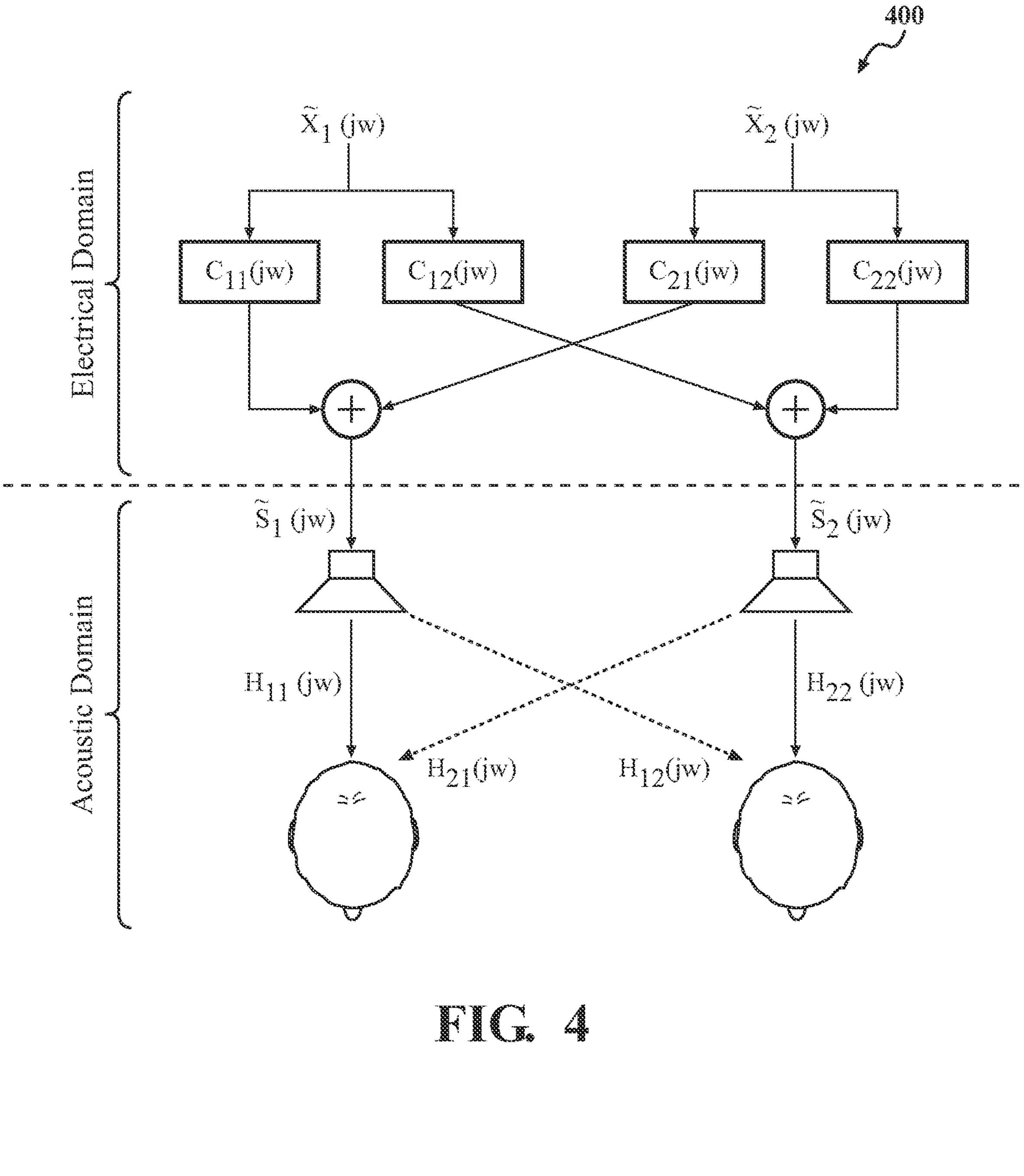
FIG. 4 is a block diagram of a basic structure of an audio system modelling the acoustic and electrical domains of audio signals and transfer functions.

FIG. 4 is a block diagram 400 of a basic structure of the CTC FIR filters 312. The first down-sampled input audio $\tilde{X}_1(j\omega)$ and the second down-sampled input audio signal $\tilde{X}_2(j\omega)$ are provided, as for example by a telephone receiver (not shown), in the vehicle. The down-sampled first and second audio input signals are filtered by inverse filters $C_{11}(j\omega)$, $C_{12}(j\omega)$, $C_{21}(j\omega)$, and $C_{22}(j\omega)$. The filtered first and second audio input signals are combined 302 as shown in FIG. 4. Signal $\tilde{S}_1(j\omega)$ is supplied to the loudspeaker 122 in the first ISZ 112, and is calculated as:

$$\tilde{S}_1(j\omega) = C_{11}(j\omega) * \tilde{X}_1(j\omega) + C_{21}(j\omega) * \tilde{X}_2(j\omega) \tag{1}$$

Signal $\tilde{S}_2(j\omega)$ is supplied to the loudspeaker 122 in the second ISZ 114 and is calculated as:

$$\tilde{S}_2(j\omega) = C_{12}(j\omega) * \tilde{X}_1(j\omega) + C_{22}(j\omega) * \tilde{X}_2(j\omega) \tag{2}$$

The loudspeakers 122 radiate signals $\tilde{S}_1(j\omega)$ and $\tilde{S}_2(j\omega)$ as acoustic signals that propagate to the first and second ISZs 112, 114. The sound signals that are present at the first and second ISZs 112, 114 are $Z_1(j\omega)$ and $Z_2(j\omega)$, wherein:

$$Z_1(j\omega) = H_{11}(j\omega) * \tilde{S}_1(j\omega) + H_{21}(j\omega) * \tilde{S}_2(j\omega) \tag{3}$$

and $$Z_2(j\omega) = H_{12}(j\omega) * \tilde{S}_1(j\omega) + H_{22}(j\omega) * \tilde{S}_2(j\omega). \tag{4}$$

In equations (3) and (4), transfer functions $H_{11}(j\omega)$, $H_{21}(j\omega)$, $H_{12}(j\omega)$, and $H_{22}(j\omega)$ denote the room impulse response (RIR) in the frequency domain, i.e., the transfer function from loudspeakers 122 to the respective sound zones, for example the first ISZ 112 and the second ISZ 114.

Because the front passenger listener in the second sound zone 114 does not necessarily want to hear the conversation that is taking place by the driver in the first ISZ 112, signal processing modifies the signal played back loudspeakers 122 to establish a bright zone within a predetermined range of the first ISZ 112, and to establish a dark zone outside of a predetermined range of the first ISZ 112. Each ISZ in the listening space utilizes only headrest speaker(s) within a predetermined distance of each ISZ and does not involve any other speakers in the listening space. The audio signals are processed by a processing module connected to the loudspeakers in a headrest of the ISZ. The processing module is configured to generate audio for the headrest loudspeakers 122 that is greater than or equal to 300 Hz, reducing the processing load and limiting latency to 5 msec.

Figure 5:
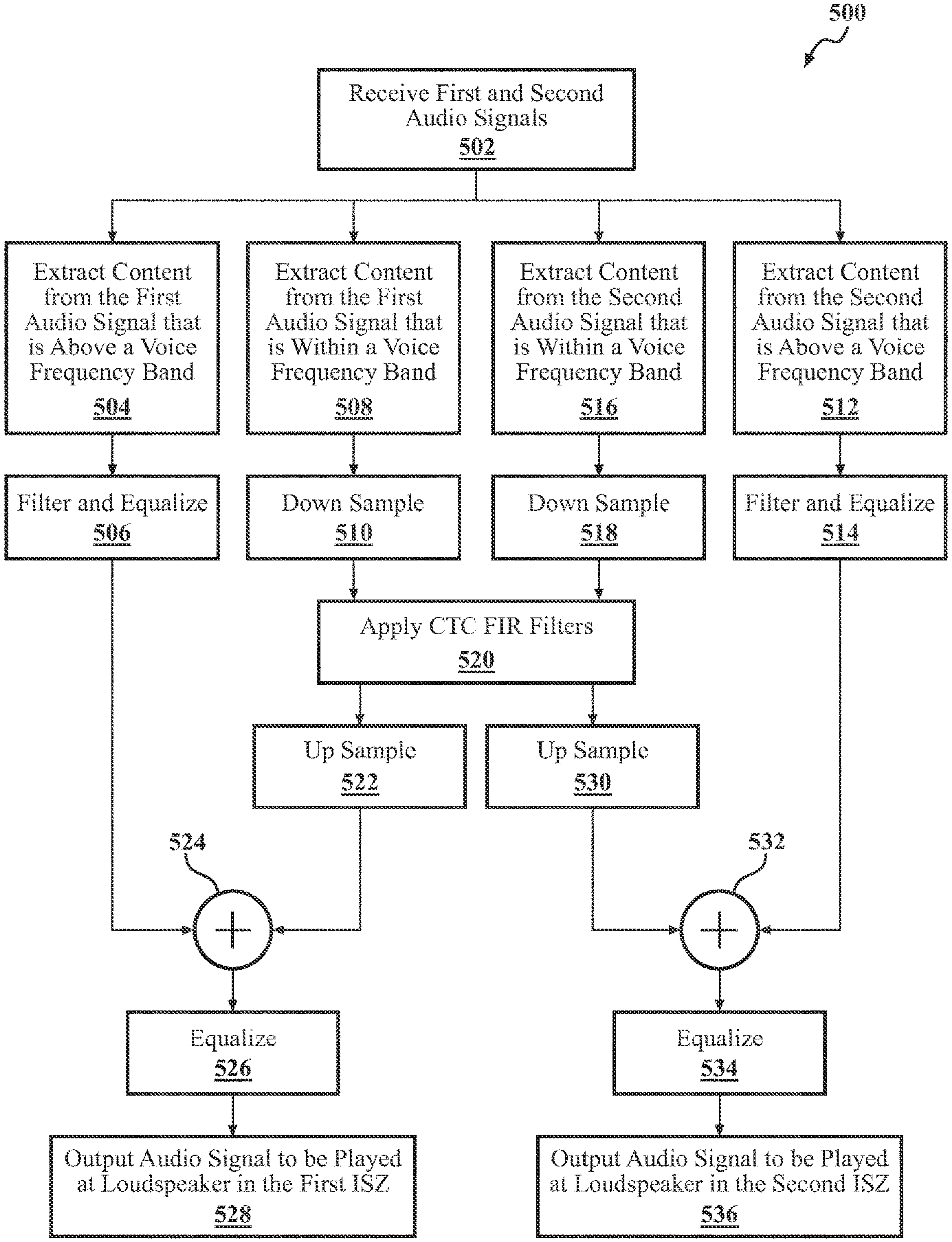
FIG. 5 is a flow chart of a method for low latency ISZs.

FIG. 5 is a method 500 for generating a low latency sound zone in a listening space. The method is implemented using coded instruction (computer readable instructions) stored in a non-transitory computer readable medium such as a flash memory, a read-only memory (ROM), a random-access memory (RAM), a cache, or any other storage media in which information is stored. Computer memory of computer readable storage mediums as referenced herein may include volatile and non-volatile or removable and non-removable media for a storage of electronically formatted information, such as computer readable program instructions or modules of computer readable program instructions, data, etc., that may be stand-alone or as part of a computing device. Examples of computer memory may include any other medium which can be used to store the desired electronic format of information, and which can be accessed by the processor or processors or at least a portion of a computing device.

The processor may be configured to execute computer readable instructions stored in memory. The processor may be single core or multi-core, and the programs executed by the processor may be configured for parallel or distributed processing. The processor may be any technically feasible hardware unit configured to carry out processing functions and execute software applications, including but not limited to, a central processing unit (CPU), a microcontroller unit (MCU), an application specific integrated circuit (ASIC), a digital signal processor (DSP) chip, a field-programmable gate array (FPGA), a graphic board, etc.

The method receives 502, at an audio system in a listening space having a plurality of ISZs, first and second audio signals to be played back by at least a respective loudspeaker in each of the plurality of ISZs. In the present example, the audio system is receiving a first audio signal to be played back in the first ISZ and a second audio signal to be played back in the second ISZ. The loudspeaker in each ISZ is positioned in the ISZ to be close to, within inches, of a listener's ear.

The method extracts 504, from the first audio signal, audio content above a predetermined frequency, hereinafter high frequency audio. The predetermined frequency is greater than a voice frequency band, which band is typically between 300 Hz and 3400 Hz. The method filters and equalizes 506 the high frequency content of the first audio signal.

The method extracts 508, from the first audio signal, audio content within the voice frequency band. The method down-samples 510 the audio content within the voice frequency band of the first audio signal.

Simultaneously, the method extracts 512, from the second audio signal, audio content above the predetermined frequency. The method filters and equalizes 514 the high frequency content of the second audio signal. The method extracts 516, from the second audio signal, audio content within the voice frequency band, and down-samples 518 the audio content within the voice frequency band of the second audio signal.

The method applies 520 a set of crosstalk cancellation (CTC) filters to the down-sampled audio content of the first audio signal and the down-sampled audio content of the second audio signal. After applying 520 the CTC filters, the audio content within the voice frequency band for the first ISZ is up-sampled 522 and recombined 524 with the high frequency audio content of the first audio signal. The method equalizes 526 and outputs 528 an audio signal to be played back at the loudspeaker in the first ISZ.

After applying 520 the CTC filters, the audio content within the voice frequency band for the second ISZ is up-sampled 530 and recombined 532 with the high frequency audio content of the second audio signal. The method equalizes 534 and outputs 536 an audio signal to be played back at the loudspeaker in the second ISZ.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name a few examples.

Benefits, other advantages, and solutions to problems have been described above regarding embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A system for low latency individual sound zones in a listening space comprising:

a first individual sound zone defined by a proximity of at least a first loudspeaker being within inches to a head of a first listener;

an incoming first audio signal;

a second individual sound zone defined by a proximity of at least a second loudspeaker being within inches to a head of a second listener;

an incoming second audio signal;

a signal processing module configured to extract frequency content, from the incoming first audio signal in the first individual sound zone, including a first audio signal within a voice frequency band and a first audio signal with frequency greater than the voice frequency band;

the signal processing module configured to extract frequency content, from the incoming second audio signal in the second individual sound zone, including a second audio signal within the voice frequency band and a second audio signal with a frequency greater than the voice frequency band;

the signal processing module is configured to generate frequency content to cancel, in the first individual sound zone, the second audio signal within the voice frequency band;

the signal processing module is configured to generate frequency content to cancel, in the second individual sound zone, the first audio signal within the voice frequency band;

the signal processing module is configured to combine the frequency content of the first audio signal within the voice frequency band, the frequency content of the first audio signal with frequency higher than the voice frequency band, and the frequency content to cancel the second audio signal within the voice frequency band, the combined frequency content to be played back in the first sound zone; and the signal processing module is configured to combine the frequency content of the second audio signal within the voice frequency band, the frequency content of the second audio signal with frequency higher than the voice frequency band, and the frequency content to cancel the first audio signal with the voice frequency band, the combined frequency content to be played back in the second sound zone.

2. The system as claimed in claim 1, further comprising:

the signal processing module configured to down sample the frequency content of the first audio signal within the voice frequency band, apply crosstalk cancellation finite impulse response (FIR) filters only to the down-sampled frequency content of the first audio signal within the voice frequency band, and up sample the cross-talk-cancelled frequency content of the first audio signal within the voice frequency band; and the signal processing module configured to down sample the frequency content of the second audio signal within the voice frequency band, apply crosstalk cancellation FIR filters only to the down-sampled frequency content of the second audio signal within the voice frequency band, and up sample the cross-talk-cancelled frequency content of the second audio signal within the voice frequency band.

3. The system as claimed in claim 2, further comprising:

the signal processing module configured to apply a set of infinite impulse response (IIR) filters to the frequency content of the first audio signal greater than the voice frequency band prior to combining the frequency content of the first audio signal greater than the voice frequency band with the frequency content of the up-sampled frequency content of the first audio signal within the voice frequency band, and the frequency content to cancel the second audio signal within the voice frequency band; and the signal processing module configured to apply a set of IIR filters to the frequency content of the second audio signal greater than the voice frequency band prior to combining the frequency content of the second audio signal greater than the voice frequency band with the frequency content of the up-sampled frequency content of the second audio signal within the voice frequency band, and the frequency content to cancel the first audio signal within the voice frequency band.

4. The system as claimed in claim 1, wherein the voice frequency band is between 300 Hz and 3400 Hz.

5. A method for generating a low latency sound zone in a listening space, the method comprising the steps of:

receiving first and second audio signals to be played back by first and second loudspeakers in first and second individual sound zones in the listening space, the first and second loudspeakers are located within inches of an ear of a listener in each of the first and second individual sound zones;

extracting, from the first audio signal, audio content above a predetermined frequency;

filtering and equalizing the extracted audio content;

extracting, from the first audio signal, audio content within a predetermined frequency band;

down sampling the audio content, from the first audio signal, within the predetermined frequency band;

extracting, from the second audio signal, audio content above the predetermined frequency;

filtering and equalizing the audio content;

extracting, from the second audio signal, audio content within the predetermined frequency band;

down-sampling the audio content, from the second audio signal, within the predetermined frequency band;

applying a set of crosstalk cancellation filters to the down-sampled audio content of the first audio signal and the down-sampled audio content of the second audio signal;

up sampling the audio content within the predetermined frequency band for the first audio signal and recombining the up-sampled audio content with the extracted audio content from the first audio signal that is above the predetermined frequency;

equalizing and outputting a first audio signal output to be played back at the first individual sound zone;

up sampling the audio content within the predetermined frequency band for the second audio signal and recombining the up-sampled audio content with the audio content extracted from the second audio signal that is above the predetermined frequency; and equalizing and outputting a second audio signal output to be played back at the second individual sound zone.

6. The method as claimed in claim 5, wherein the steps of filtering further comprise:

applying a set of infinite impulse response (IIR) filters to the extracted audio content of the first audio signal that is greater than the predetermined frequency to cancel the second audio signal within the predetermined frequency band; and applying a set of IIR filters to the extracted audio content of the second audio signal that is greater than the predetermined frequency to cancel the first audio signal within the predetermined frequency band.

7. The method as claimed in claim 5, wherein the predetermined frequency band is between 300 Hz and 3400 Hz.

8. A computer readable medium comprising instructions which, when executed by a computing device, cause the computing device to carry out a method for generating a low latency sound zone in a listening space, the method comprising the steps of:

receiving first and second audio signals to be played back by first and second loudspeakers in first and second individual sound zones in the listening space, the first and second loudspeakers are located within inches of an ear of a listener in each of the first and second individual sound zones;

extracting, from the first audio signal, audio content above a predetermined frequency;

filtering and equalizing the extracted audio content;

extracting, from the first audio signal, audio content within a predetermined frequency band;

down sampling the audio content, from the first audio signal, within the predetermined frequency band;

extracting, from the second audio signal, audio content above the predetermined frequency;

filtering and equalizing the audio content;

extracting, from the second audio signal, audio content within the predetermined frequency band;

down-sampling the audio content, from the second audio signal, within the predetermined frequency band;

applying a set of crosstalk cancellation filters to the down-sampled audio content of the first audio signal and the down-sampled audio content of the second audio signal;

up sampling the audio content within the predetermined frequency band for the first audio signal and recombining the up-sampled audio content with the extracted audio content from the first audio signal that is above the predetermined frequency;

equalizing and outputting a first audio signal output to be played back at the first individual sound zone;

up sampling the audio content within the predetermined frequency band for the second audio signal and recombining the up-sampled audio content with the audio content extracted from the second audio signal that is above the predetermined frequency; and equalizing and outputting a second audio signal output to be played back at the second individual sound zone.

9. The method as claimed in claim 8, wherein the steps of filtering further comprise:

applying a set of IIR filters to the extracted audio content of the first audio signal that is greater than the predetermined frequency to cancel the second audio signal within the predetermined frequency band; and applying a set of IIR filters to the extracted audio content of the second audio signal that is greater than the predetermined frequency to cancel the first audio signal within the predetermined frequency band.

10. The method as claimed in claim 8, wherein the predetermined frequency band is between 300 Hz and 3400 Hz.

* * * * *